(12) United States Patent
Guo

(10) Patent No.: US 10,693,663 B2
(45) Date of Patent: Jun. 23, 2020

(54) TWO DIMENSIONAL CODE GENERATION AND RECOGNITION

(71) Applicant: Alibaba Group Holding Limited, George Town (KY)

(72) Inventor: Wei Guo, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 318 days.

(21) Appl. No.: 15/893,159

(22) Filed: Feb. 9, 2018

(65) Prior Publication Data

US 2018/0234252 A1    Aug. 16, 2018

(51) Int. Cl.
| | |
|---|---|
| *H04L 29/06* | (2006.01) |
| *H04L 9/32* | (2006.01) |
| *G06K 19/06* | (2006.01) |
| *H04L 9/14* | (2006.01) |
| *G06Q 10/00* | (2012.01) |

(52) U.S. Cl.
CPC ...... *H04L 9/3249* (2013.01); *G06K 19/06037* (2013.01); *G06Q 10/00* (2013.01); *H04L 9/14* (2013.01); *H04L 63/0442* (2013.01); *H04L 63/0876* (2013.01)

(58) Field of Classification Search
CPC ......... G06K 19/06037; G06K 17/0022; G06Q 10/00; H04L 63/0442; H04L 63/0876; H04L 9/14; H04L 9/3249; H04L 9/3247
See application file for complete search history.

(56) References Cited

U.S. PATENT DOCUMENTS

| | | | |
|---|---|---|---|
| 9,137,420 B1* | 9/2015 | Vasudevan | ......... H04N 1/32144 |
| 2009/0283589 A1 | 11/2009 | Moore et al. | |
| 2012/0310852 A1 | 12/2012 | Ramalingamorrthy et al. | |
| | (Continued) | | |

FOREIGN PATENT DOCUMENTS

| | | |
|---|---|---|
| CN | 1427977 | 5/2010 |
| CN | 102243739 | 11/2011 |
| | (Continued) | |

OTHER PUBLICATIONS

K. Seino et al., "Development of the traceability system which secures the safety of fishery products using the QR code and a digital signature," Oceans '04 MTS/IEEE Techno-Ocean '04 (IEEE Cat. No. 04CH37600), Kobe, 2004, pp. 476-481. (Year: 2004).*

(Continued)

*Primary Examiner* — John B King
(74) *Attorney, Agent, or Firm* — Fish & Richardson P.C.

(57) ABSTRACT

The present disclosure describes technologies related to two-dimensional (2D) code generation and recognition. In one implementation, registration information is received from a server for authenticating and registering the server, and the server is registered if the registration information is authenticated. The registration information is then saved. A request from the server for generating a 2D code is received, wherein the request includes information to be encoded to the 2D code. The information to be encoded to the 2D code is digitally signed by generating a digital signature using asymmetrical encryption, and the digitally signed information is sent to the server to be encoded to the 2D code.

17 Claims, 10 Drawing Sheets

(56) References Cited

U.S. PATENT DOCUMENTS

| | | | |
|---|---|---|---|
| 2013/0085941 A1* | 4/2013 | Rosenblatt | G06Q 20/1085 |
| | | | 705/44 |
| 2013/0112760 A1 | 5/2013 | Schory et al. | |
| 2014/0282923 A1 | 9/2014 | Narayan et al. | |

FOREIGN PATENT DOCUMENTS

| | | |
|---|---|---|
| CN | 102779263 | 11/2012 |
| CN | 103839097 | 6/2014 |
| CN | 104077624 | 10/2014 |
| CN | 104134142 | 11/2014 |
| CN | 104320263 | 1/2015 |
| CN | 105024824 | 11/2015 |
| JP | 2016006945 | 1/2016 |

OTHER PUBLICATIONS

International Search Report and Written Opinion in International Application No. PCT/US2018/018157, dated May 3, 2018, 12 pages.
Second Written Opinion in International Application No. PCT/US2018/018157, dated Jan. 21, 2019, 6 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Preliminary Report on Patentability in International Application No. PCT/US2018/018157, dated Apr. 15, 2019, 18 pages.

\* cited by examiner

TWO DIMENSIONAL CODE GENERATION AND RECOGNITION

This application claims priority to Chinese Patent Application No. 201710078901.6, filed on Feb. 14, 2017, which is incorporated by reference, in its entirety.

TECHNICAL FIELD

This disclosure relates to data security based on two-dimensional code.

BACKGROUND

A two-dimensional (2D) code (for example, a 2D barcode or a quick response (QR) code) can record data symbolically by using a bar and space alternating graph formed by a particular type of geometric graph distributed on a plane (in a 2D direction), according to a particular rule. The 2D code has features such as large information capacity, a wide coding range, strong error tolerance, and high decoding reliability. It is also low cost and easy to produce.

With the development of the Internet and popularization of mobile devices, 2D codes are widely used for various data-related activities. For example, a merchant can post a payment 2D code at a checkout, and a user can scan the payment 2D code by using a 2D code scanning function in an application. Or, in a product promotion, a merchant can post an application-downloadable 2D code in relatively crowded places (such as, a metro or a shopping mall), to attract people passing by to scan the 2D code and to download an associated application. Therefore, merchants or third parties need to provide authentic and valid 2D codes for users, and the users need to be able to effectively verify the 2D codes.

SUMMARY

The present disclosure describes methods and systems, including computer-implemented methods, computer program products, and computer systems for two-dimensional (2D) code generation and recognition.

In an implementation, registration information is received from a server for authenticating and registering the server. The server is registered if the registration information is authenticated. The registration information is saved. A request from the server for generating a 2D code is received, wherein the request includes information to be encoded to the 2D code. The information to be encoded to the 2D code is digitally signed by generating a digital signature using asymmetrical encryption, and the digitally signed information is sent to the server to be encoded to the 2D code.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, authentic and valid 2D codes can be easily generated by a trusted third party or a merchant to enhance security. Second, the users can efficiently check validity of the 2D codes.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes computer implemented technologies related to two-dimensional code generation and recognition, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art can be omitted so as to not obscure one or more described implementations. The present disclosure is not intended to be limited to the described or illustrated implementations, but to be accorded the widest scope consistent with the described principles and features.

An application is a piece of software that can be directly executed by a user on a computer operating system (OS) or a mobile OS. The application can include an embedded application or a third-party application stored in memory or database of a computing device. The embedded application can refer to an application pre-installed in the computing device. For example, the embedded application can be a browser, an e-mail, or an instant messenger. Third-party applications can be of various types and can be any application that is downloaded from an online application store and installed on a computing device, such as a payment application, a shopping application, or an entertainment application.

Figure 1:
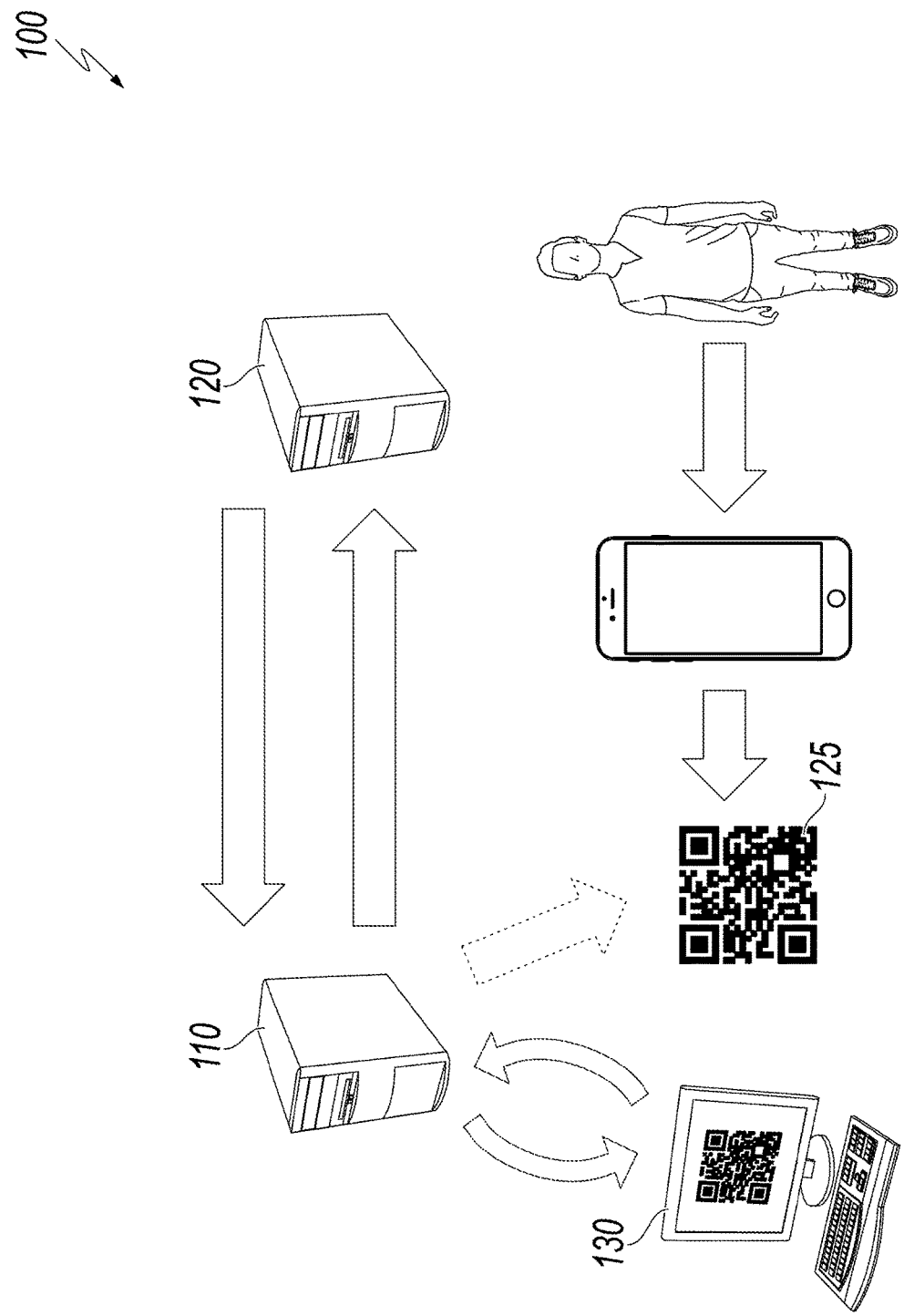
FIG. 1 is a diagram of a scenario where a two-dimensional (2D) code generation method, according to an implementation of the present disclosure.

FIG. 1 is a schematic diagram showing an example 100 of a 2D code generation method, according to an implementation of the present disclosure. As shown in FIG. 1, a first server 110 and a second server 120 are connected in a wired or wireless manner. It should be understood that, in the implementations of the present disclosure, the wireless connection can be a one-to-one wireless connection, such as Bluetooth and Near Field Communication (NFC). A Wireless Local Area Network (WLAN) can also be used in a security guaranteed scenario to provide WIFI connectivity.

The first server 110 is a server for generating a 2D code 125. For example, the first server 110 can be an application server or a website server. For example, if the first server 110 is a payment application server, the first server 110 can generate a 2D code about a commodity in response to a user input. Alternatively, if the first server 110 is a website server, various 2D codes generated by the first server 110, according to generation requirements, can be displayed on a display. The second server 120 can be a third-party server with an authorized certification (such as, an ALIPAY application server).

It should be noted that both the first server 110 and the second server 120 are computing devices, can respond to server requests and perform processing. Moreover, architectures of the two servers can be similar to an architecture of a general-purpose computer. In the present disclosure, the first server 110 and the second server 120 can provide different services.

As illustrated in FIG. 1, the first server 110 and the second server 120 can interactively process data. The first server 110 can generate a 2D code based on information provided by the second server 120. This process is discussed in details in the illustration of FIG. 2.

Next, the first server 110 can display the 2D code on a display, or directly outputs the 2D code by using an output device such as a printer. Then, a user can scan the 2D code by using a scanning unit, such as a camera in a mobile device.

Figure 2:
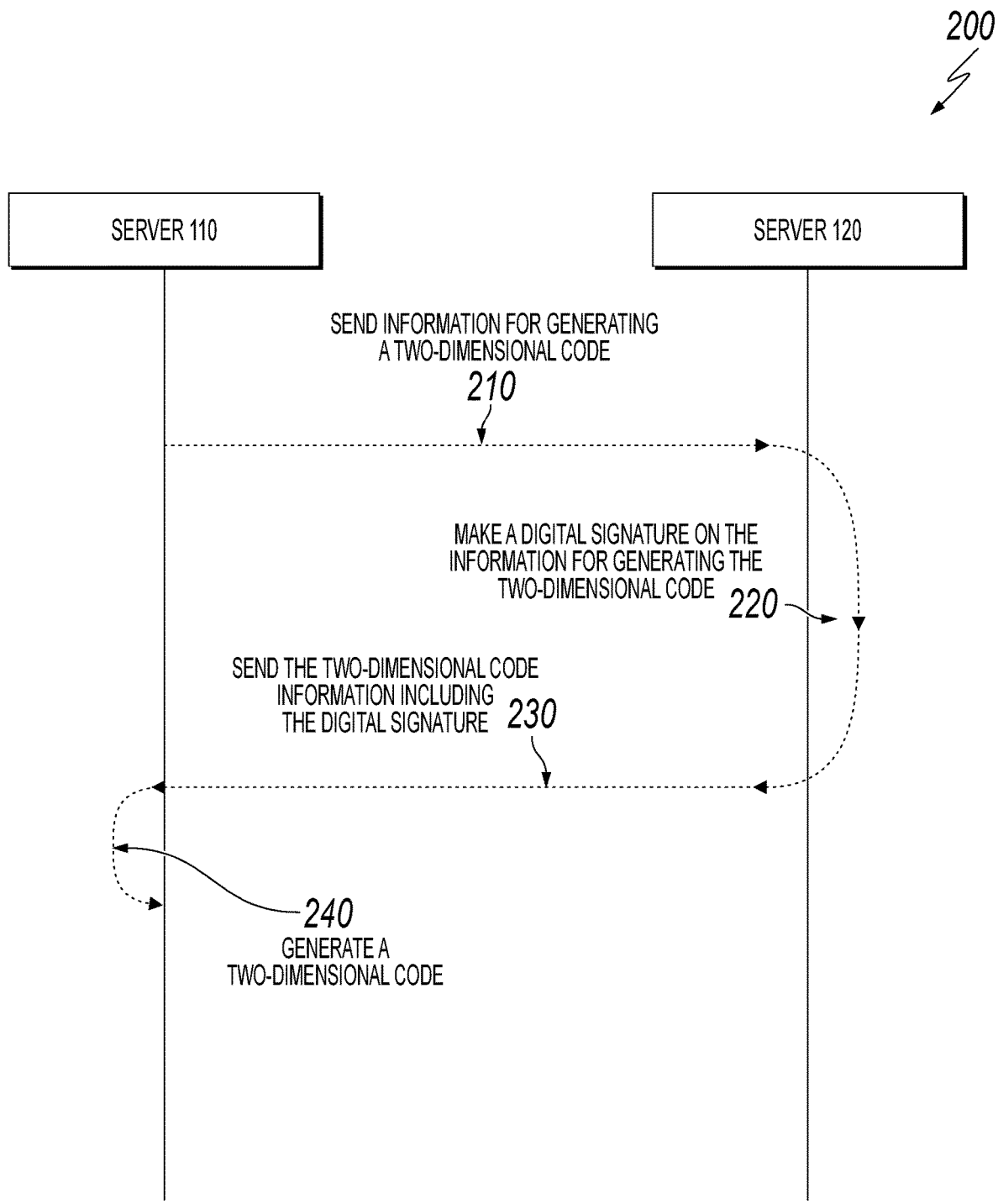
FIG. 2 is a schematic diagram of interaction processing between a first server and a second server shown in FIG. 1, according to an implementation of the present disclosure.

FIG. 2 is a swim lane diagram showing an example of data processing 200 between a first server 110 and a second server 120 for 2D code generation, according to an implementation of the present disclosure. For clarity of presentation, the description that follows generally describes data processing 200 in the context of the other figures in this description. However, it will be understood that data processing 200 can be performed, for example, by any system, environment, software, and hardware, or a combination of systems, environments, software, and hardware, as appropriate. In some implementations, various steps of data processing 200 can be run in parallel, in combination, in loops, or in any order.

At 210, the first server 110 sends a 2D code generation request to the second server 120. The request can include information for generating a 2D code (or 2D code information for brevity). For example, the 2D code information can include payee account information or website information.

In some cases, before performing step 210, the first server 110 can send a registration request to the second server 120 before sending 2D code generation request. The registration request can include information related to registering the server. For example, the first server 110 can provide various qualification authentications to the second server 120, such as business certificates or commodity details. Next, after successfully authenticating the 2D code information provided by the first server 110, the second server 120 can complete registration of the first server 110. In addition, the qualification authentications provided by the first server 110 can be stored in a memory of the second server 120. In some cases, the qualification authentications can be stored in a remote memory. As such, the qualification authentications can be invoked based on an address in the remote memory, if needed.

As such, after the first server 110 sends the 2D code generation request to the second server 120, the second server 120 can perform verification on the first server 110 to determine whether the first server 110 has been registered at the second server 120. If not, the second server 120 does not provide subsequent services and reminds the first server 110 to perform registration. Specifically, the second server 120 can reject the 2D code generation request of the first server 110 and sends a registration invitation to the first server 110. If the first server 110 has already registered at the second server 120, subsequent steps can be performed.

Through the foregoing registration steps, the second server 120 can provide services for apparatuses that are authenticated, thereby guaranteeing the validity of the 2D code collaboratively generated by the second server 120, and preserving evidence of use for possible dispute with owner of the first server 110. From 210, data processing 200 proceeds to 220.

At 220, the second server 120 can generate a digital signature on the 2D code information based on an asymmetric encryption algorithm. Specifically, the second server 120 can generate a digital signature on the 2D code information in the 2D code generation request in step 210 based on the asymmetric encryption algorithm and a pre-generated private key (which is stored in the second server 120). As such, in a 2D code recognition process, if a 2D code is successfully scanned by using a public key, it can indicate that the 2D code is a 2D code the first server 110 generated through the second server 120. If the scanning fails, it can indicate that the 2D code may be a counterfeit 2D code or is a 2D code that is generated by the first server 110 without processing through the second server 120.

It should be noted that the second server 120 can generate different digital signatures based on different 2D code information. In other words, the second server 120 can provide different private keys based on different 2D code information. For example, the different 2D code information can correspond to different merchants. The second server 120 can provide different private keys to different merchants. As such, for one or more merchandizes of the same merchant, a private key corresponds to the merchant can be used to generate digital signatures for the 2D code information. Therefore, even for different links of different merchandizes sent by a same website, digital signatures can be made on the different links by using different private keys for different merchants.

The foregoing asymmetric encryption algorithm can be referred to as a public key encryption algorithm. In this algorithm, data is encrypted by using a public key, and can be decrypted by using a corresponding private key. Alternatively, data is encrypted by using a private key, and is decrypted by using a corresponding public key. According to an example implementation, the asymmetric encryption algorithm can include a Rivest-Shamir-Adleman (RSA) public key encryption algorithm, an Elgamal encryption algorithm, a knapsack algorithm, or an elliptic curve cryptography (ECC) encryption algorithm. To guarantee the authenticity and effectiveness of the 2D code, the RSA public key encryption algorithm can be selected to encrypt the generated transaction data.

For simplicity, a detailed description of generating a digital signature on data by using an asymmetric encryption algorithm is omitted from the disclosure. It should be noted that, although example asymmetric encryption algorithms are mentioned in the present disclosure, those skilled in the art should understand that other asymmetric encryption algorithms capable of generating a digital signature may also be applied. From 220, data processing 200 proceeds to 230.

At 230, the second server 120 can send the 2D code information including the digital signature to the first server 110. From 230, data processing 200 proceeds to 240.

At 240, after receiving the 2D code information including the digital signature, the first server 110 generates the 2D code by using the 2D code information including the digital signature. Specifically, the 2D code can be generated based on a 2D code generation algorithm and by using the 2D code information as well as the digital signature. The 2D code generation algorithm includes a QR code algorithm.

Detailed description on generating a 2D code based on a 2D code generation algorithm is omitted here for simplicity. Those skilled in the art should understand that any 2D code generation algorithms capable of generating a 2D code can be applied here. From 240, data processing 240 stops.

Figure 3:
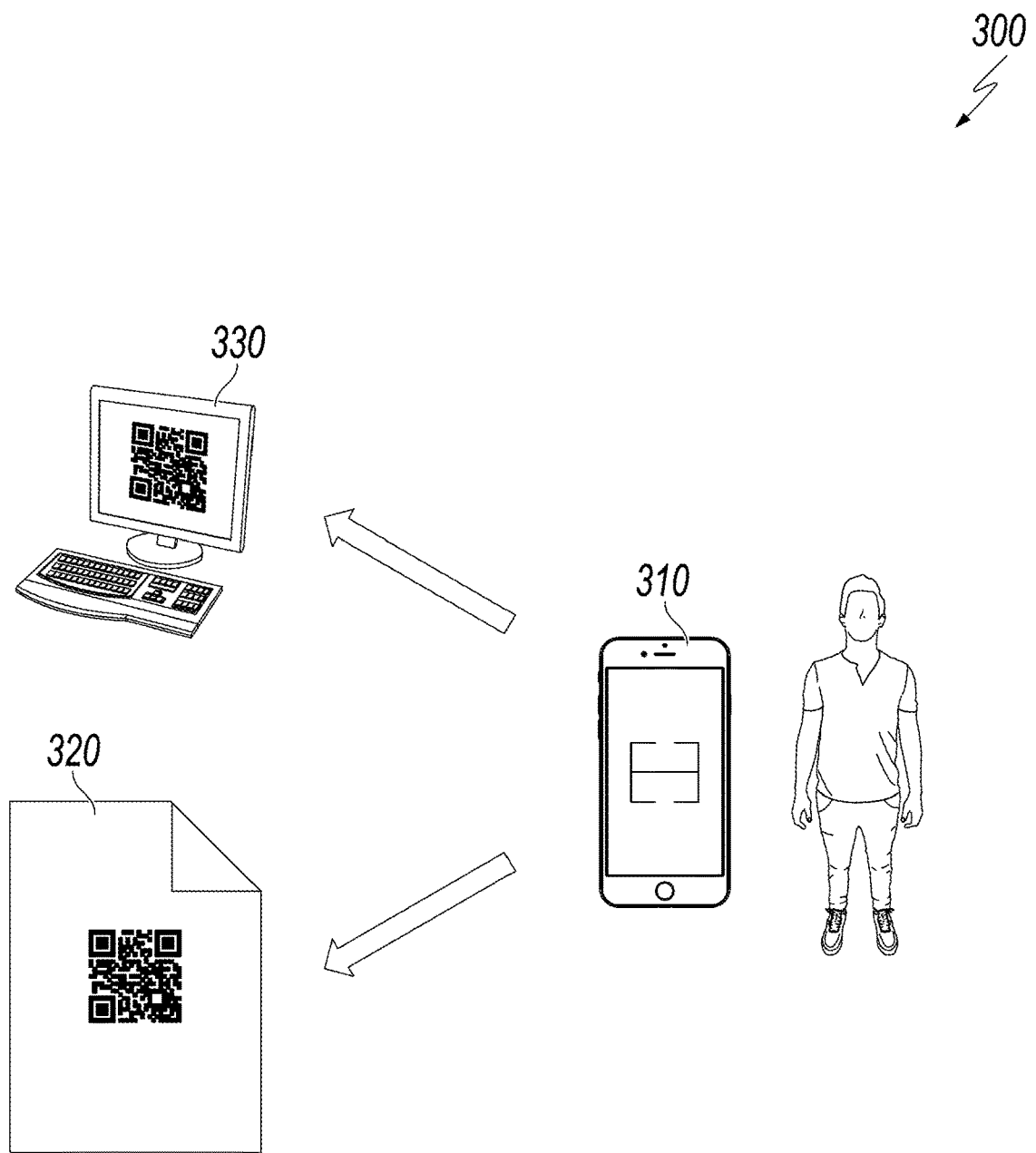
FIG. 3 is a schematic diagram of recognition of a 2D code, according to an implementation of the present disclosure.

FIG. 3 is a schematic diagram showing an example 300 of authenticating a 2D code, according to an implementation of the present disclosure. As shown in FIG. 3, a user can use a mobile device 310 to verify a printed 2D code 320 or a 2D code displayed on a display/output device 330.

The user can start an application corresponding to the second server 120. For example, the user can start, in the mobile device 310, the ALIPAY application corresponding to the ALIPAY server. Subsequently, the user can scan the 2D code 320 or the 2D code displayed on the display/output device 330, by using a scanning function in the application.

It should be noted that, in the 2D code recognition process, the user can use the scanning function of an application that corresponds to the second server 120, because the application that corresponds to the second server 120 includes or can obtain a public key corresponding to the 2D code.

In some cases, after the 2D code 320/330 is scanned by using the scanning unit in the application, the public key can be obtained from the second server 120 or a remote storage device that stores the public key. Subsequently, verification can be performed on the scanned 2D code 320/330 by using the public key. If the verification is successful, the 2D code 320/330 can be recognized so as to perform the next operation. In other words, an operation interface corresponding to the 2D code 320/330 can be displayed on a display interface of the mobile device 310 based on a recognition result of the 2D code 320/330. For example, if the recognition result of the 2D code 320 is a link associated ALIPAY, the mobile device 310 can invoke the ALIPAY application, thereby displaying an operation interface associated with ALIPAY on a display unit (for example, on mobile device 310). If the recognition result of the 2D code 320/330 is a link associated with WECHAT, the mobile device can invoke the WECHAT application, thereby displaying an operation interface associated with WECHAT on the display unit. If the recognition result of the 2D code 320/330 is a link associated with a website, the mobile device 310 can invoke a browser application, thereby displaying an operation interface about the browser on the display unit.

If the verification is unsuccessful, it can indicate that the 2D code 320/330 is tampered with. In some cases, a party who tampers with the 2D code 320/330 may have also registered with the second server 120, and a 2D code 320/330 that has been tampered with is also collaboratively generated by the second server 120. For example, merchant B tears down a printed 2D code 320 posted by merchant A, and posts a different 2D code 320 that has been tampered with. The 2D code 320 that has been tampered with and posted by merchant B can be successfully recognized by using the scanning unit in the application that corresponds to the second server 120. However, the scanning process can be recorded. Merchant B who tampers with the 2D code 320 can be determined based on the scanning record, and the identity of merchant B can be determined based on information provided during the registration process.

Figure 4:
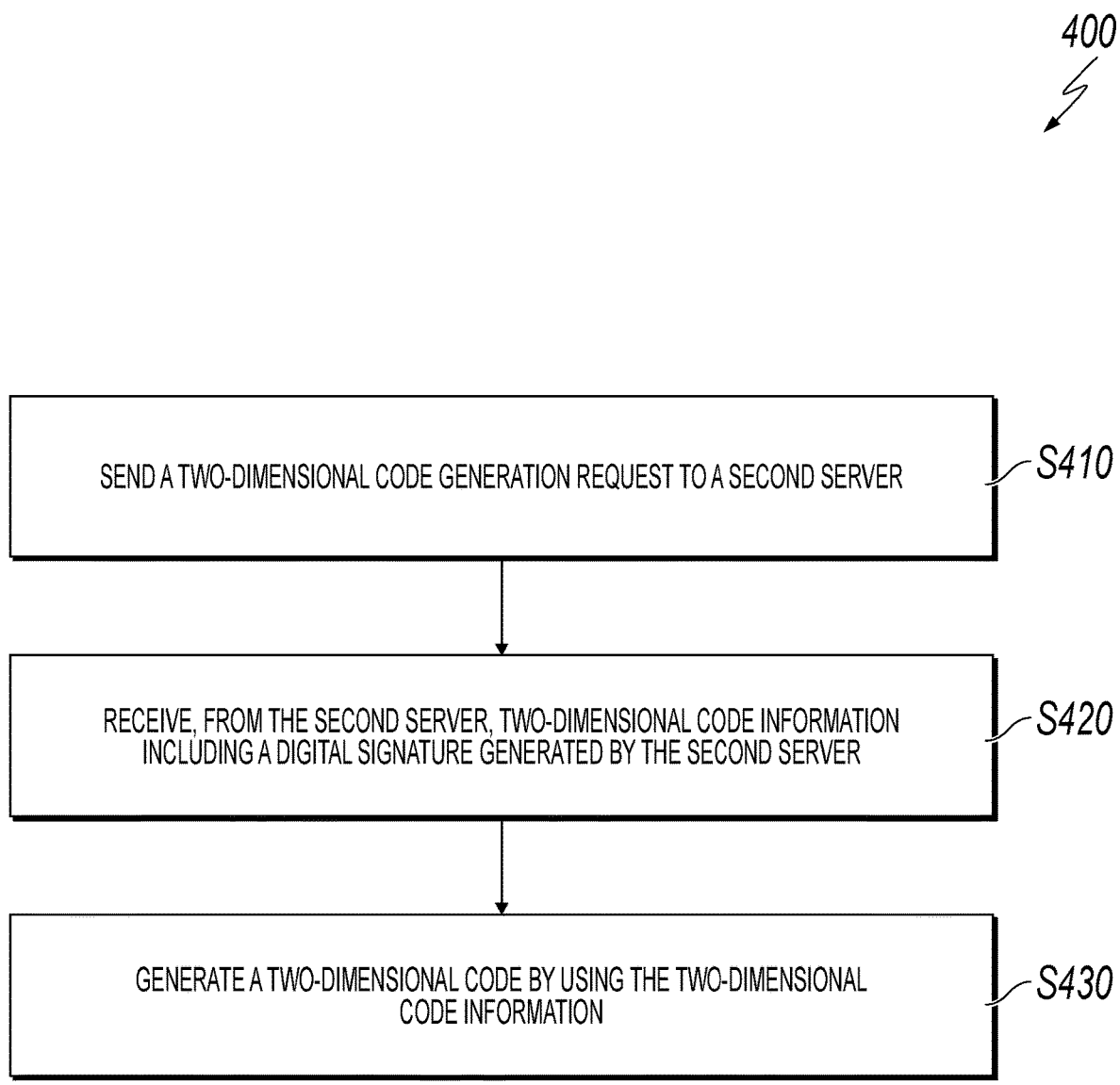
FIG. 4 is a flowchart of a 2D code generation method executed by a first server, according to an implementation of the present disclosure.

FIG. 4 is a flowchart showing an example of a 2D code generation method 400 performed by a first server, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 410, a 2D code generation request is sent to a second server, the request can include information for generating a 2D code. From 410, method 400 proceeds to 420.

At 420, 2D code information including a digital signature generated by the second server is received. From 420, method 400 proceeds to 430.

At 430, the 2D code is generated based on the 2D code information. In some cases, before sending the 2D code generation request to the second server, the method further includes sending a registration request to the second server, the registration request including information related to server registration. After 430, method 400 stops.

Figure 5:
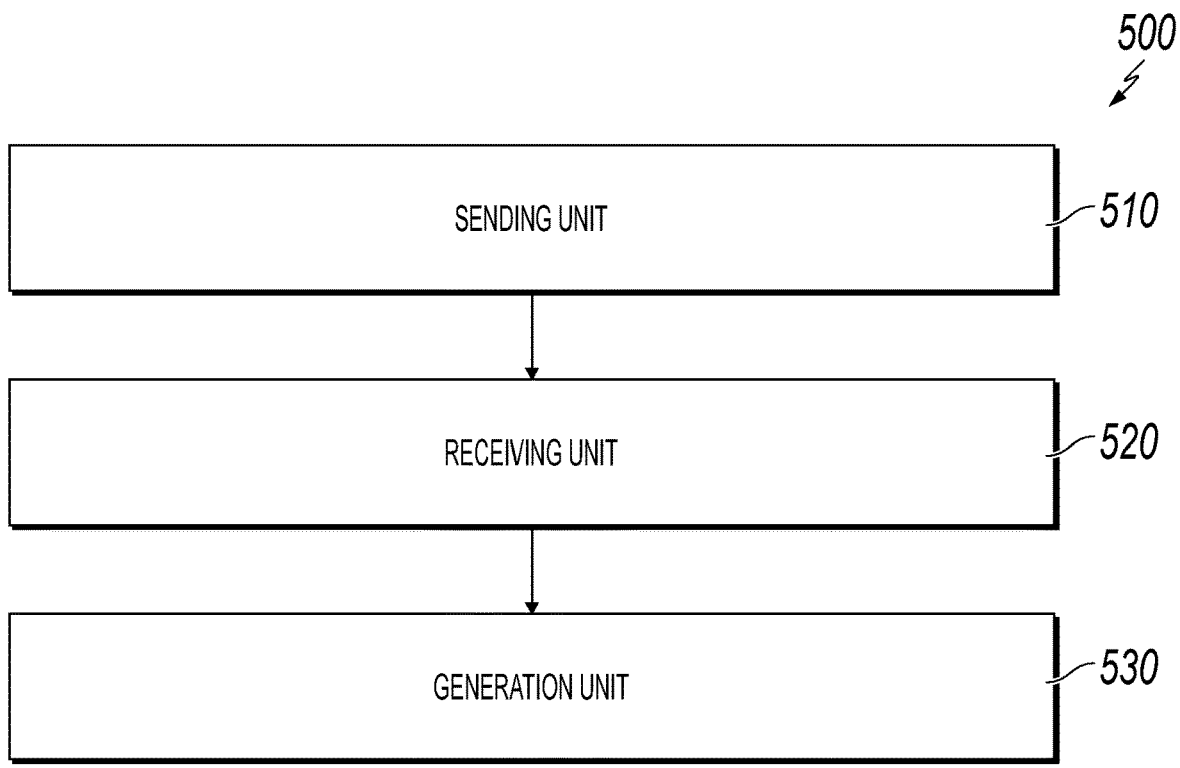
FIG. 5 is a block diagram of a 2D code generation device that executes the 2D code generation method shown in FIG. 4, according to an implementation of the present disclosure.

FIG. 5 is a block diagram showing an example of a 2D code generation device 500, according to an implementation of the present disclosure. The 2D code generation device can be the first server that can perform the 2D code generation method 400, as discussed in the description of FIG. 4.

Those skilled in the art can understand that the structure of the 2D code generation device 500 shown in FIG. 5 is not limited to the disclosed generation device 500 in the present disclosure. The electronic device can include more or fewer components than those shown in FIG. 5, or some components can be combined, or different component layouts can be employed.

As shown in FIG. 5, the 2D code generation device can include a sending unit 510, a receiving unit 520, and a generation unit 530.

The sending unit 510 can be configured to send a 2D code generation request to a second server. The request can include information for generating a 2D code.

The receiving unit 520 can be configured to receive 2D code information, including a digital signature generated by the second server.

The generation unit 530 can be configured to generate a 2D code by using the 2D code information.

In an alternative implementation, the sending unit 510 can be configured to send a registration request to the first server before sending the 2D code generation request to the first server, the registration request can include information for registering the first server on the second server.

Figure 6:
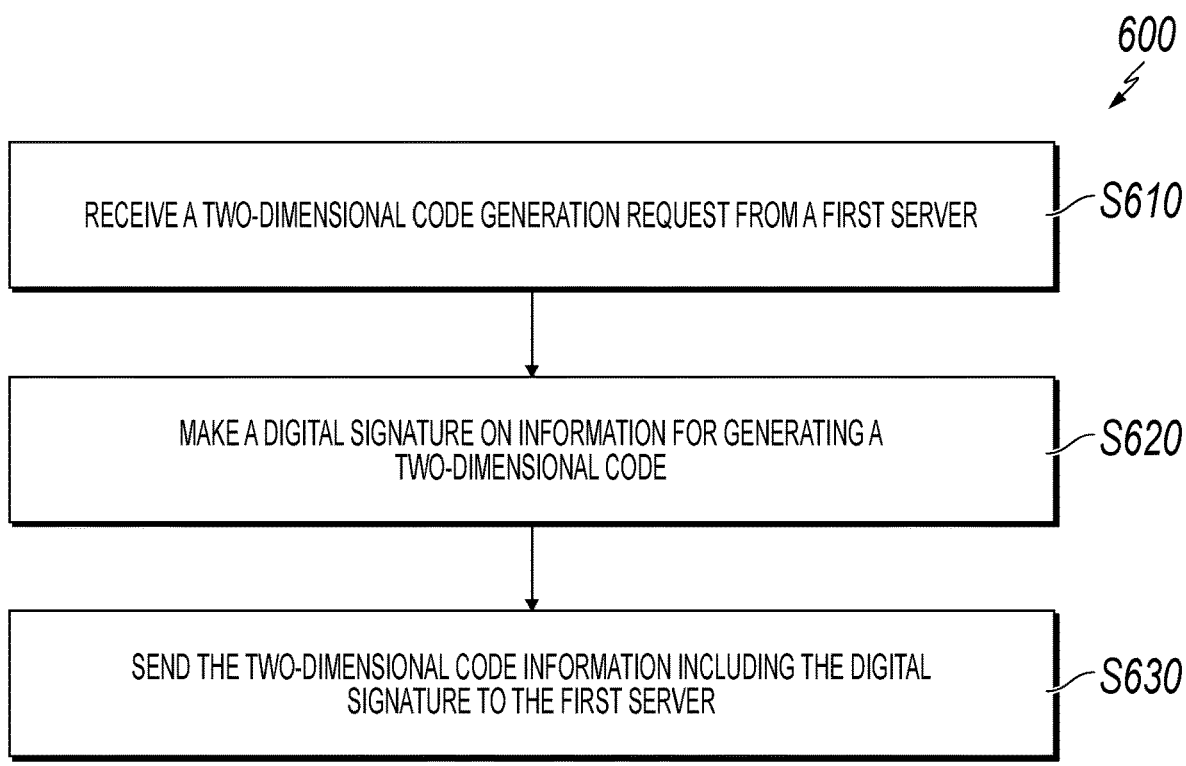
FIG. 6 is a flowchart of a 2D code generation method executed by a second server, according to an implementation of the present disclosure.

FIG. 6 is a flowchart showing an example 2D code generation method 600 performed by a second server, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 610, a 2D code generation request is received from a first server, the request can include information for generating a 2D code. From 610, method 600 proceeds to 620.

At 620, a digital signature is generated on the information for generating the 2D code. From 620, method 600 proceeds to 630.

At 630, 2D code information including the digital signature is sent to the first server.

In some cases, before receiving a 2D code generation request from a first server, the method further includes receiving a registration request from the first server, wherein the registration request can include information related to registering the first server to the second server. Moreover, after receiving the registration request from the first server, the 2D code generation method can include completing registration of the first server based on the registration request. After 630, method 600 stops.

Figure 7:
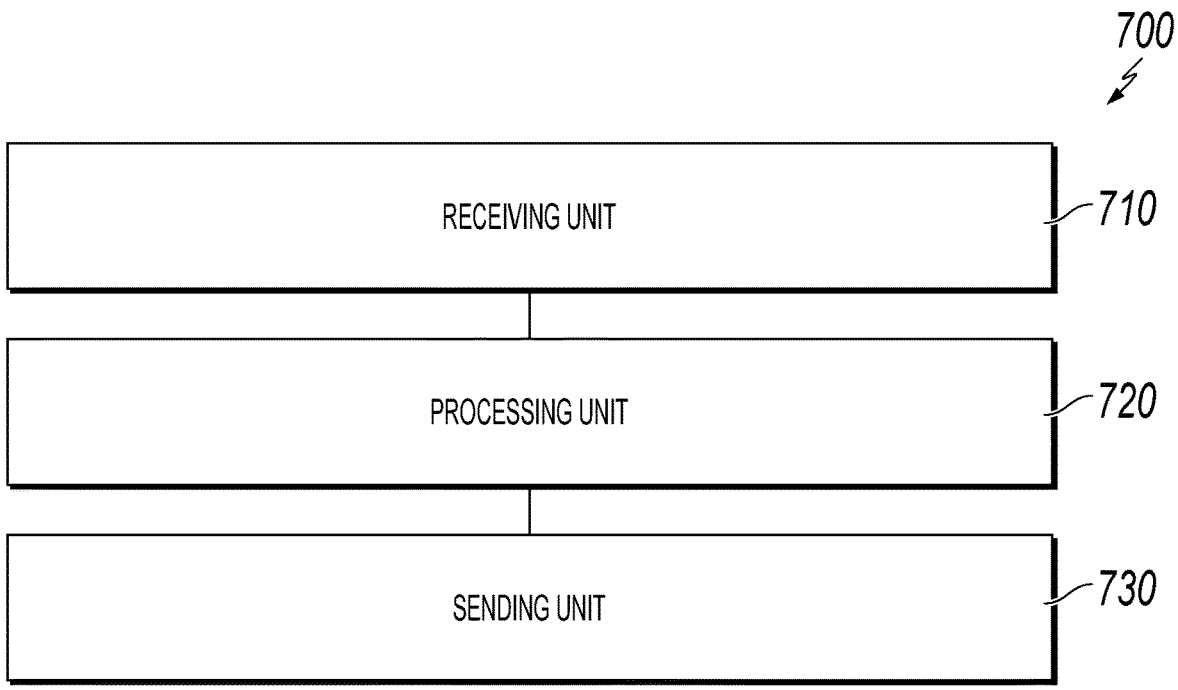
FIG. 7 is a block diagram of a 2D code generation device that executes the 2D code generation method shown in FIG. 6, according to an implementation of the present disclosure.

FIG. 7 is a block diagram showing an example 2D code generation device 700, according to an implementation of the present disclosure. The 2D code generation device 700 can be the second server that performs the 2D code generation method 600, as discussed in the description of FIG. 6.

Those skilled in the art can understand that the structure of the 2D code generation device 700 shown in FIG. 7 is not limited to the disclosed generation device 700. The 2D code generation device 700 can include more or fewer components than those shown in FIG. 7, or some components can be combined, or different component layouts can be employed.

The 2D code generation device can include a receiving unit 710, a processing unit 720 and a sending unit 730.

The receiving unit 710 is configured to receive a 2D code generation request from a first server, the request including information for generating a 2D code. In an alternative implementation, the receiving unit is further configured to receive a registration request from the first server, wherein the registration request can include information related to registering the first server to the second server.

In an alternative implementation, the 2D code generation device can include a registration unit, and the registration unit is configured to complete registration for the first server based on the registration request.

The processing unit 720 is configured to generate a digital signature on the information for generating the 2D code. In some cases, the processing unit 720 can be configured to generate a digital signature on the information for generating the 2D code based on an asymmetric encryption algorithm.

The sending unit 730 is configured to send the 2D code information including the digital signature to the first server.

In an alternative implementation, the 2D code generation device can further include a determination unit. The determination unit is configured to determine whether the first server is registered at the second server. If yes, a digital signature is made according to the received 2D code generation request on the information for generating the 2D code. Otherwise, no digital signature is generated on the information for generating the 2D code, and a registration invitation can be sent to the first server.

In an alternative implementation, according to different information for generating the 2D code, different private keys can be used for generating the digital signature on the information for generating the 2D code.

In another example implementation, a 2D code generation system can be provided. The system can include a 2D code generation device 500 as shown in FIG. 5 and a 2D code generation device 700 as shown in FIG. 7.

According to the 2D code generation methods and devices disclosed in the implementations described previously, a 2D code can be generated collaboratively between two servers to improve security and effectiveness of 2D code generation. 2D code tampering is also more easily identified during 2D code recognition.

Figure 8:
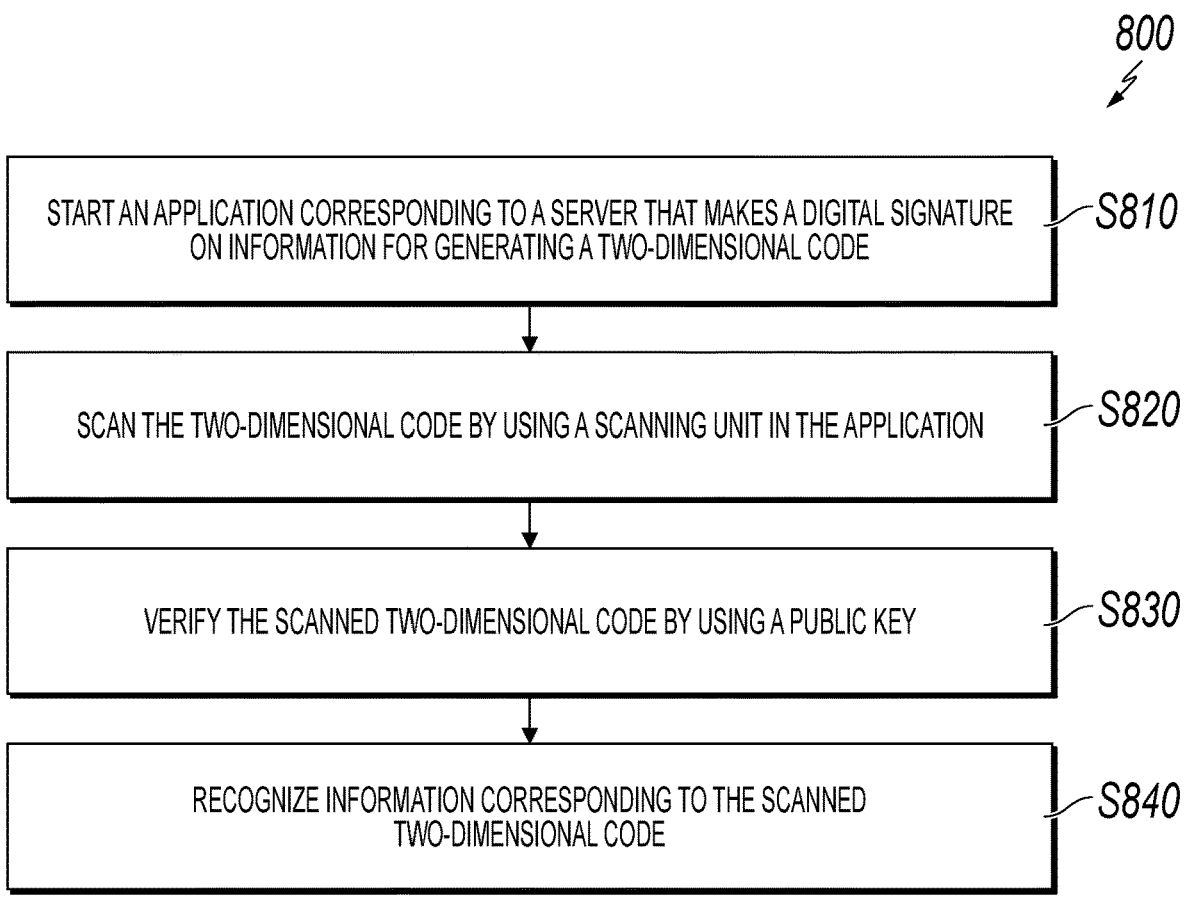
FIG. 8 is a flowchart of a 2D code recognition method, according to an implementation of the present disclosure.

FIG. 8 is a flowchart showing an example of a 2D code recognition method 800, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 810, an application corresponding to a server that can generate a digital signature on information for generating a 2D code is initiated. From 810, method 800 proceeds to 820.

At 820, the 2D code is scanned by using a scanning unit in the application. From 820, method 800 proceeds to 830.

At 830, the scanned 2D code is verified by using a public key. From 830, method 800 proceeds to 840.

At 840, information corresponding to the scanned 2D code is recognized if the verification is successful. After 840, method 800 stops.

In an alternative implementation, the public key is obtained from the server or a remote storage device. In addition, the method can further include storing related information during the verification step.

Figure 9:
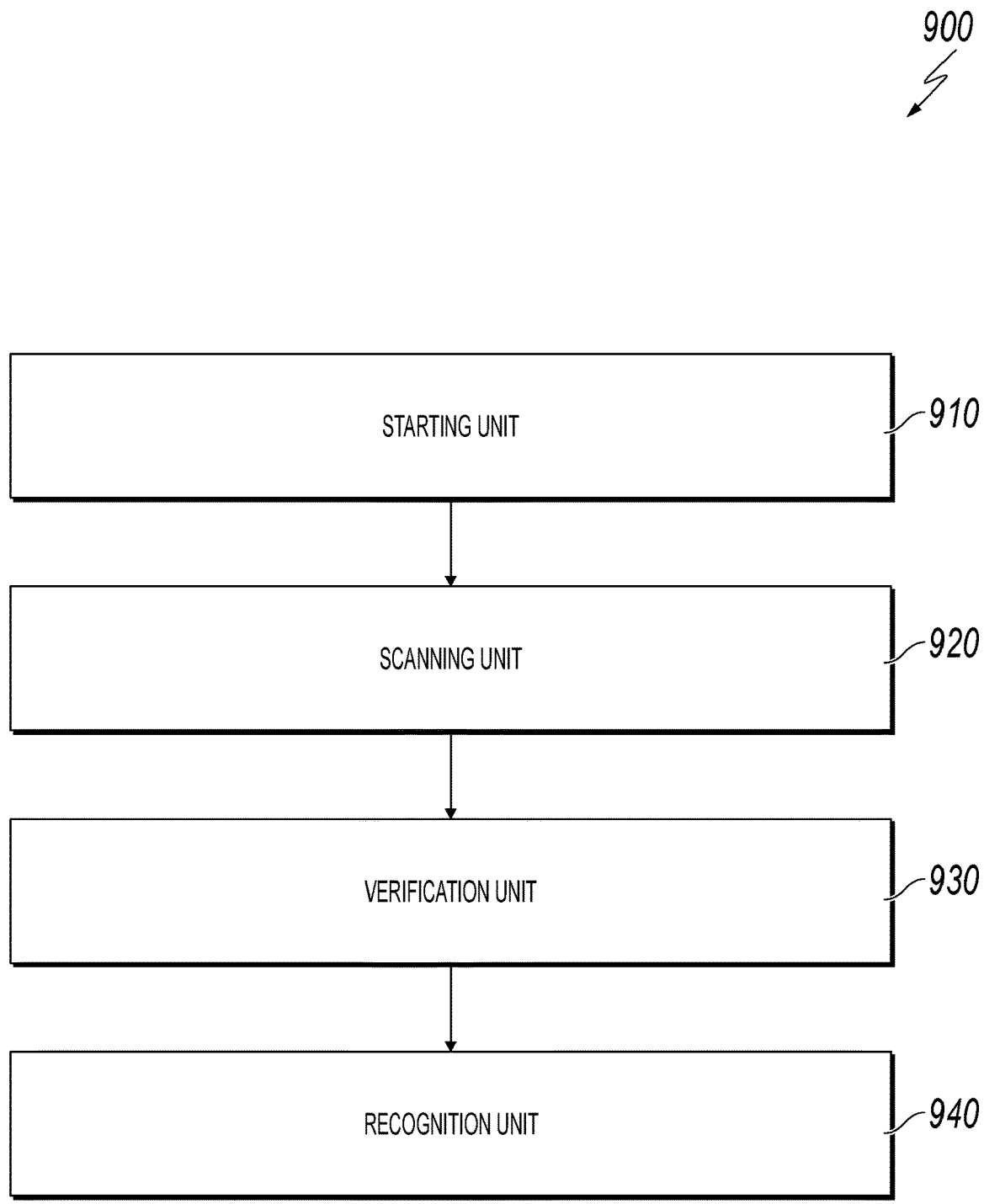
FIG. 9 is a block diagram of a 2D code recognition device that executes the 2D code recognition method shown in FIG. 8, according to an implementation of the present disclosure.

FIG. 9 is a block diagram showing an example of a 2D code recognition device 900, according to an implementation of the present disclosure. The 2D code recognition device 900 can perform the 2D code recognition method 800, as discussed in the description of FIG. 8.

Those skilled in the art can understand that the structure of the 2D code recognition device 900 shown in FIG. 9 is not limited to the disclosed recognition device 900. The 2D code recognition device 900 can include more or fewer components than those shown in FIG. 9, or some components can be combined, or different component layouts can be employed.

The 2D code recognition device can include a starting unit 910, a scanning unit 920, a verification unit 930 and a recognition unit 940.

The starting unit 910 can be configured to start an application corresponding to a server that generates a digital signature on information for generating the 2D code.

The scanning unit 920 can be configured to scan the 2D code by using a scanning unit in the application.

The verification unit 930 can be configured to verify the scanned 2D code by using a public key.

The recognition unit 940 can be configured to recognize information corresponding to the scanned 2D code if the verification performed by the verification unit 930 is successful.

In an alternative implementation, the public key is obtained from the server or a remote storage device.

In an alternative implementation, the 2D code recognition device further includes a storage unit, and the storage unit is configured to store related information for verifying the scanned 2D code.

Figure 10:
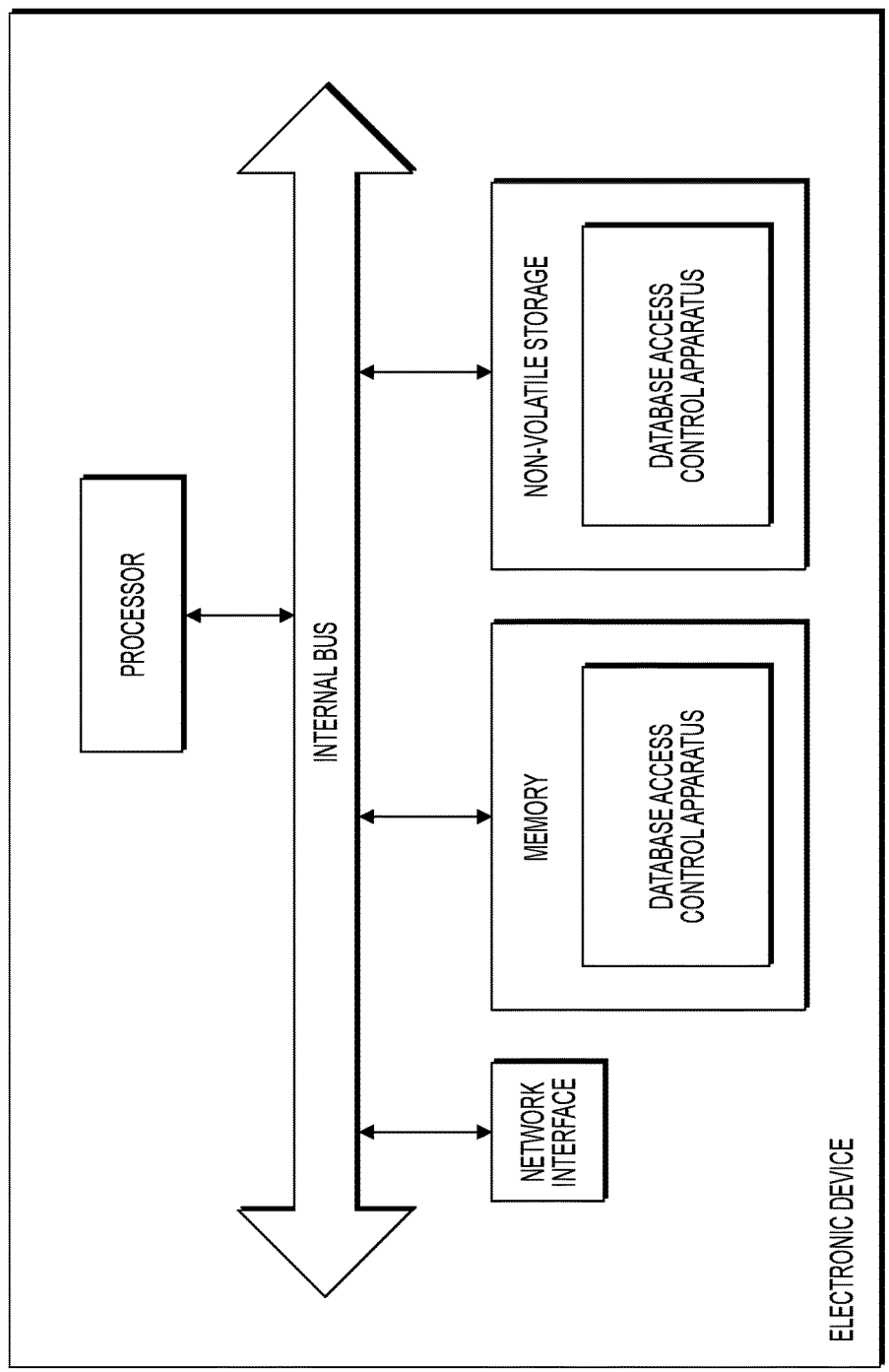
FIG. 10 is a block diagram of an electronic device, according to an implementation of the present disclosure.

FIG. 10 is a block diagram showing an example of an electronic device 1000 that performs the 2D code generation method or 2D code recognition method, according to an implementation of the present disclosure. Referring to FIG. 10, at a hardware level, the electronic device includes a processor, an internal bus, a network interface, a memory, and a non-volatile storage method. The electronic device may further include other hardware required by services. The processor reads a corresponding computer program from the non-volatile storage method into the memory and runs the computer program, to form a webpage screenshot apparatus at a logic level. In addition to the software implementation, the present application does not exclude other implementations, such as logical devices or a combined software and hardware manner. In other words, the following processing procedure is not limited to being executed by various logical units, but may also be executed by hardware or logical devices.

The 2D code recognition method and device provided according to the implementations of the present disclosure recognize, through a specific application, information corresponding to a 2D code by using a public key, thus adding authenticity determination in a 2D code recognition process, and preventing the 2D code from being tampered with.

In the 1990s, an improvement on a technology may have obviously been distinguished as an improvement on hardware (for example, an improvement on a circuit structure such as a diode, a transistor, and a switch) or an improvement on software (an improvement on a method procedure). However, with the development of technologies, improvements of many method procedures at present may be considered as direct improvements on hardware circuit structures. Almost all designers program the improved method procedures into hardware circuits to obtain corresponding hardware circuit structures. Therefore, it is improper to assume that the improvement of a method procedure cannot be implemented by using a hardware entity module. For example, a Programmable Logic Device (PLD) (for example, a Field Programmable Gate Array (FPGA)) is such an integrated circuit whose logic functions are determined by devices programmed by a user. Designers program by themselves to "integrate" a digital system into a piece of PLD, without the need to ask a chip manufacturer to design and manufacture a dedicated integrated circuit chip. Moreover, at present, the programming is mostly implemented by using "logic compiler" software, instead of manually manufacturing an integrated circuit chip. The logic compiler software is similar to a software complier used for developing and writing a program, and original code before compiling also needs to be written by using a specific programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art also should know that a hardware circuit for implementing the logic method procedure may be easily obtained by slightly logically programming the method procedure using the several hardware description languages discussed and programming them into an integrated circuit.

A controller may be implemented in any suitable manner. For example, the controller may be in the form of, for example, a microprocessor or a processor and a computer readable medium storing computer readable program code (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of control logic of a memory. Those skilled in the art also know that, the controller may be implemented by using pure computer readable program code, and in addition, the method steps may be logically programmed to enable the controller to implement the same function in a form of a logic gate, a switch, an application specific integrated circuit, a programmable logic controller, an embedded microcontroller, and the like. Therefore, this type of controller may be considered as a hardware component, and apparatuses included therein for implementing various functions may also be considered as structures inside the hardware component. Or, the apparatuses used for implementing various functions may even be considered as both software modules for implementing the method and structures inside the hardware component.

The system, apparatus, module or unit illustrated in the previous implementations may be specifically implemented by using a computer chip or an entity, or a product having a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, when the apparatus is described, it is divided into various units in terms of functions for respective descriptions. As such, when the present application is implemented, functions of the units may be implemented in the same or multiple pieces of software and/or hardware.

Those skilled in the art should understand that the implementations of the present invention may be provided as a method, a system, or a computer program product. Therefore, the present invention may be implemented as a complete hardware implementation, a complete software implementation, or an implementation combining software and hardware. Moreover, the present invention may be a computer program product implemented on one or more computer usable storage media (including, but not limited to, a magnetic disk memory, a CD-ROM, an optical memory, and the like) including computer usable program code.

The present application is described with reference to flowcharts and/or block diagrams according to the method, device (system) and computer program product according to the implementations of the present invention. It should be understood that a computer program instruction may be used to implement each process and/or block in the flowcharts and/or block diagrams and combinations of processes and/or blocks in the flowcharts and/or block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a particular manner, such that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, such that a series of operation steps are performed on the computer or another programmable device, thereby generating computer-implemented processing. Therefore, the instructions executed on the computer or another programmable device provide steps for implementing a specified function in one or more processes in the flowcharts and/or in one or more blocks in the block diagrams.

In a typical configuration, a computation device includes one or more central processing units (CPUs), an input/output interface, a network interface, and a memory.

The memory may include computer readable media such as a volatile memory, a Random Access Memory (RAM), and/or non-volatile memory, for example, Read-Only Memory (ROM) or flash RAM. The memory is an example of a computer readable medium.

The computer readable medium includes non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessed by the computing device. According to the definition of this text, the computer readable medium does not include transitory media, such as a modulated data signal and a carrier.

It should be further noted that the term "include", "comprise" or other variations thereof are intended to cover non-exclusive inclusion, so that a process, method, commodity or device including a series of elements not only includes the elements, but also includes other elements not clearly listed, or further includes inherent elements of the process, method, commodity or device. In a case without any more limitations, an element defined by "including a/an . . . " does not exclude that the process, method, commodity or device including the element further has other identical elements.

Those skilled in the art should understand that the implementations of the present application may be provided as a method, a system, or a computer program product. Therefore, the present application may be implemented as a complete hardware implementation, a complete software implementation, or an implementation combining software and hardware. Moreover, the present application may be in the form of a computer program product implemented on one or more computer usable storage media (including, but not limited to, a magnetic disk memory, a CD-ROM, an optical memory and the like) including computer usable program code.

The present application may be described in a common context of a computer executable instruction executed by a computer, for example, a program module. Generally, the program module includes a routine, a program, an object, an assembly, a data structure, and the like used for executing a specific task or implementing a specific abstract data type. The present application may also be implemented in distributed computing environments, and in the distributed computer environments, a task is executed by using remote processing devices connected through a communications network. In the distributed computer environment, the program module may be located in local and remote computer storage media including a storage device.

The implementations in the specification are described progressively, identical or similar parts of the implementations may be obtained with reference to each other, and each implementation emphasizes a part different from other implementations. Especially, the system implementation is basically similar to the method implementation, so it is described simply, and for related parts, reference may be made to the descriptions of the parts in the method implementation.

The previous descriptions are merely implementations of the present application, and are not intended to limit the present application. For those skilled in the art, the present application may have various modifications and variations. Any modification, equivalent replacement, or improvement made without departing from the spirit and principle of the present application should all fall within the scope of claims of the present application.

Figure 11:
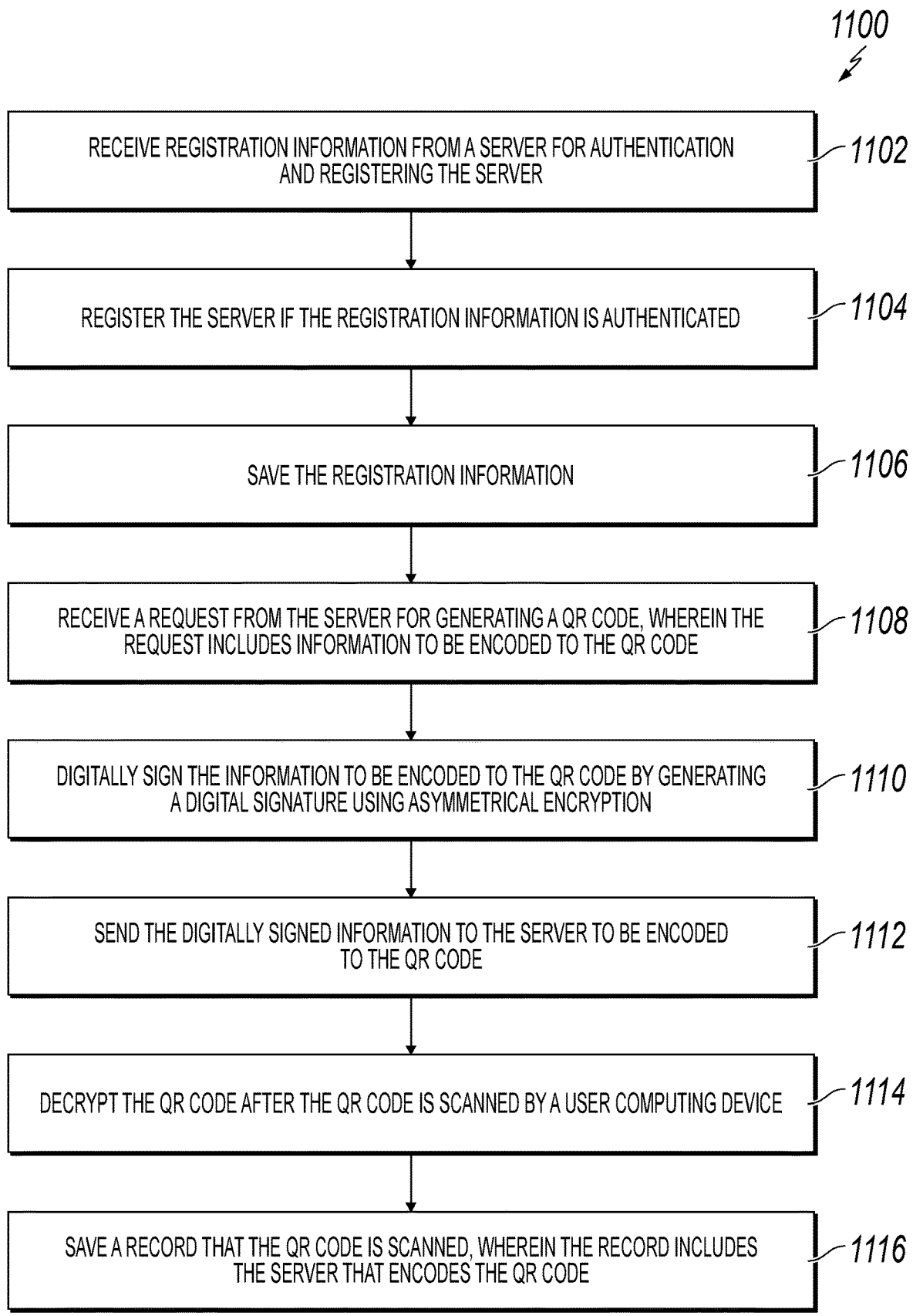
FIG. 11 is a flowchart illustrating an example of a computer-implemented method for generating a 2D code, according to an implementation of the present disclosure.

FIG. 11 is a flowchart illustrating an example of a computer-implemented method 1100 for generating a 2D code, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order. Method 1100 can be performed by a server that provides 2D code encryption information including digital signature, such as the second server discussed previously.

At 1102, registration information from a first server for authenticating and registering the first server is received. The registration request can include information related to registering the server. For example, the server can provide various qualification authentications, such as business certificates or merchandize details. After the qualification authentications are verified, the server can be registered. From 1102, method 1100 proceeds to 1104.

At 1104, the first server is registered if the registration information is authenticated. From 1104, method 1100 proceeds to 1106.

At 1106, the registration information is saved. The registration information including the qualification authentications provided by the server can be stored in a local memory or a remote memory. As such, the qualification authentications can be located for future references. From 1106, method 1100 proceeds to 1108.

At 1108, a request from the first server for generating a 2D code is received, wherein the request includes information to be encoded to the 2D code. The information to be encoded using the 2D code can include account information for receiving payment or website information that can redirect the user to the corresponding website. From 1108, method 1100 proceeds to 1110.

At 1110, the information to be encoded to the 2D code is digitally signed by generating a digital signature using asymmetrical encryption. The digital signature can be generated for the 2D code information included in the 2D code generation request. In some cases, the digital signature on the 2D code information can be generated based on an asymmetric encryption algorithm and a pre-generated private key. For example, the digital signature can be generated based on an RSA encryption algorithm. If a 2D code is successfully scanned by a user computing device using a corresponding public key, it can indicate that the 2D code is generated by the first server based on the digitally signed 2D code information. If the 2D code scanning is unsuccessful, it can indicate that the 2D code is tampered with or is not generated based on the digitally signed 2D code information. In some cases, the server that provides the digital signature can check whether the server that sends the 2D code generation request is a registered server. If not, the server can reject the 2D code generation request. From 1110, method 1100 proceeds to 1112.

At 1112, the digitally signed information is sent to the first server. The first server can use the received digitally signed 2D code information to generate the 2D code. From 1112, method 1100 proceeds to 1114.

At 1114, the 2D code is decrypted after the 2D code is scanned by a user computing device. A user can use an application, software, or software development kit (SDK) provided by the second server to scan the 2D code. In some cases, after the 2D code is scanned, the second server can verify the digital signature included in the 2D code using a public key. If the digital signature is authenticated, the second server can decrypt the 2D code and send the decrypted information to the user. In some cases, the digital signature verification algorithm can be included in the application, software, or SDK provided by the second server and installed on the user computing device. In such cases, the user can decrypt the 2D code by using the digital signature verification algorithm available on the user computing device. If the scanning is unsuccessful, the 2D code may have been tampered with. The user can be notified that the 2D code cannot be trusted. From 1114, method 1100 proceeds to 1116.

At 1116, a record that the 2D code is scanned is saved on the second server, wherein the record includes the first server that encodes the 2D code. The second server can save scanning activities of the 2D code. If the scanning is successful, but the 2D code was generated by another server misappropriating the digitally signed information, the misappropriation can be identified by the second server because the scanning activities of the 2D code are saved. After 1116, method 1100 ends.

Figure 12:
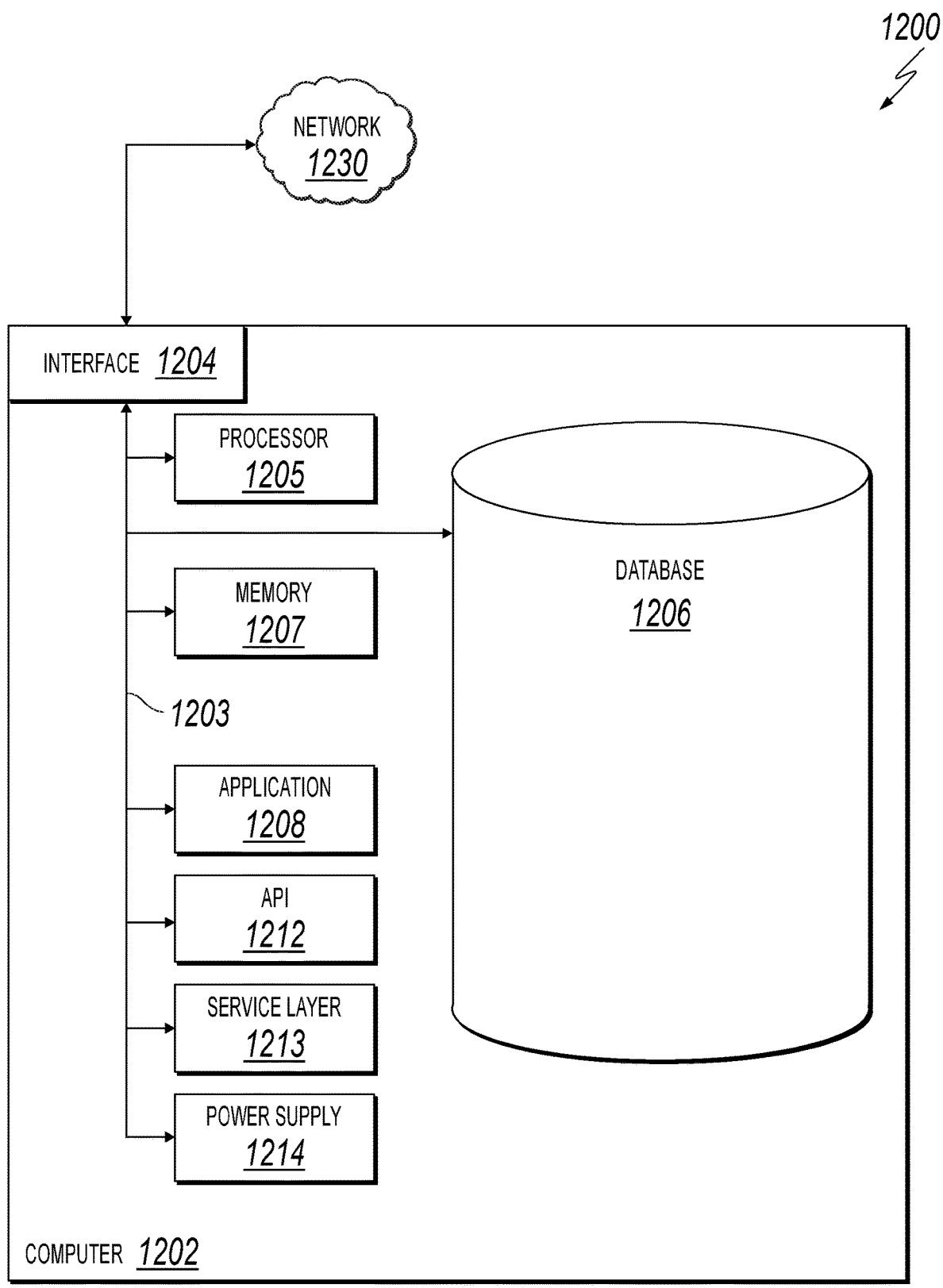
FIG. 12 is a block diagram illustrating an example of a computer-implemented system used to provide computational functionalities associated with described algorithms, methods, functions, processes, flows, and procedures, according to an implementation of the present disclosure.

FIG. 12 is a block diagram illustrating an example of a computer-implemented System 1200 used to provide computational functionalities associated with described algorithms, methods, functions, processes, flows, and procedures, according to an implementation of the present disclosure. In the illustrated implementation, System 1200 includes a Computer 1202 and a Network 1230.

The illustrated Computer 1202 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1202 can include an input device, such as a keypad, keyboard, touch screen, another input device, or a combination of input devices that can accept user information, and an output device that conveys information associated with the operation of the Computer 1202, including digital data, visual, audio, another type of information, or a combination of types of information, on a graphical-type user interface (UI) (or GUI) or other UI.

The Computer 1202 can serve in a role in a distributed computing system as a client, network component, a server, a database or another persistency, another role, or a combination of roles for performing the subject matter described in the present disclosure. The illustrated Computer 1202 is communicably coupled with a Network 1230. In some implementations, one or more components of the Computer 1202 can be configured to operate within an environment, including cloud-computing-based, local, global, another environment, or a combination of environments.

At a high level, the Computer 1202 is an electronic computing device operable to receive, transmit, process, store, or manage data and information associated with the described subject matter. According to some implementations, the Computer 1202 can also include or be communicably coupled with a server, including an application server, e-mail server, web server, caching server, streaming data server, another server, or a combination of servers.

The Computer 1202 can receive requests over Network 1230 (for example, from a client software application executing on another Computer 1202) and respond to the received requests by processing the received requests using a software application or a combination of software applications. In addition, requests can also be sent to the Computer 1202 from internal users (for example, from a command console or by another internal access method), external or third-parties, or other entities, individuals, systems, or computers.

Each of the components of the Computer 1202 can communicate using a System Bus 1203. In some implementations, any or all of the components of the Computer 1202, including hardware, software, or a combination of hardware and software, can interface over the System Bus 1203 using an application programming interface (API) 1212, a Service Layer 1213, or a combination of the API 1212 and Service Layer 1213. The API 1212 can include specifications for routines, data structures, and object classes. The API 1212 can be either computer-language independent or dependent and refer to a complete interface, a single function, or even a set of APIs. The Service Layer 1213 provides software services to the Computer 1202 or other components (whether illustrated or not) that are communicably coupled to the Computer 1202. The functionality of the Computer 1202 can be accessible for all service consumers using the Service Layer 1213. Software services, such as those provided by the Service Layer 1213, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1202, alternative implementations can illustrate the API 1212 or the Service Layer 1213 as stand-alone components in relation to other components of the Computer 1202 or other components (whether illustrated or not) that are communicably coupled to the Computer 1202. Moreover, any or all parts of the API 1212 or the Service Layer 1213 can be implemented as a child or a sub-module of another software module, enterprise application, or hardware module without departing from the scope of the present disclosure.

The Computer 1202 includes an Interface 1204. Although illustrated as a single Interface 1204, two or more Interfaces 1204 can be used according to particular needs, desires, or particular implementations of the Computer 1202. The Interface 1204 is used by the Computer 1202 for communicating with another computing system (whether illustrated or not) that is communicatively linked to the Network 1230 in a distributed environment. Generally, the Interface 1204 is operable to communicate with the Network 1230 and includes logic encoded in software, hardware, or a combination of software and hardware. More specifically, the Interface 1204 can include software supporting one or more communication protocols associated with communications such that the Network 1230 or hardware of Interface 1204 is operable to communicate physical signals within and outside of the illustrated Computer 1202.

The Computer 1202 includes a Processor 1205. Although illustrated as a single Processor 1205, two or more Processors 1205 can be used according to particular needs, desires, or particular implementations of the Computer 1202. Generally, the Processor 1205 executes instructions and manipulates data to perform the operations of the Computer 1202 and any algorithms, methods, functions, processes, flows, and procedures as described in the present disclosure.

The Computer 1202 also includes a Database 1206 that can hold data for the Computer 1202, another component communicatively linked to the Network 1230 (whether illustrated or not), or a combination of the Computer 1202 and another component. For example, Database 1206 can be an in-memory, conventional, or another type of database storing data consistent with the present disclosure. In some implementations, Database 1206 can be a combination of two or more different database types (for example, a hybrid in-memory and conventional database) according to particular needs, desires, or particular implementations of the Computer 1202 and the described functionality. Although illustrated as a single Database 1206, two or more databases of similar or differing types can be used according to particular needs, desires, or particular implementations of the Computer 1202 and the described functionality. While Database 1206 is illustrated as an integral component of the Computer 1202, in alternative implementations, Database 1206 can be external to the Computer 1202.

The Computer 1202 also includes a Memory 1207 that can hold data for the Computer 1202, another component or components communicatively linked to the Network 1230 (whether illustrated or not), or a combination of the Computer 1202 and another component. Memory 1207 can store any data consistent with the present disclosure. In some implementations, Memory 1207 can be a combination of two or more different types of memory (for example, a combination of semiconductor and magnetic storage) according to particular needs, desires, or particular implementations of the Computer 1202 and the described functionality. Although illustrated as a single Memory 1207, two or more Memories 1207 or similar or differing types can be used according to particular needs, desires, or particular implementations of the Computer 1202 and the described functionality. While Memory 1207 is illustrated as an integral component of the Computer 1202, in alternative implementations, Memory 1207 can be external to the Computer 1202.

The Application 1208 is an algorithmic software engine providing functionality according to particular needs, desires, or particular implementations of the Computer 1202, particularly with respect to functionality described in the present disclosure. For example, Application 1208 can serve as one or more components, modules, or applications. Further, although illustrated as a single Application 1208, the Application 1208 can be implemented as multiple Applications 1208 on the Computer 1202. In addition, although illustrated as integral to the Computer 1202, in alternative implementations, the Application 1208 can be external to the Computer 1202.

The Computer 1202 can also include a Power Supply 1214. The Power Supply 1214 can include a rechargeable or non-rechargeable battery that can be configured to be either user- or non-user-replaceable. In some implementations, the Power Supply 1214 can include power-conversion or management circuits (including recharging, standby, or another power management functionality). In some implementations, the Power Supply 1214 can include a power plug to allow the Computer 1202 to be plugged into a wall socket or another power source to, for example, power the Computer 1202 or recharge a rechargeable battery.

There can be any number of Computers 1202 associated with, or external to, a computer system containing Computer 1202, each Computer 1202 communicating over Network 1230. Further, the term "client," "user," or other appropriate terminology can be used interchangeably, as appropriate, without departing from the scope of the present disclosure. Moreover, the present disclosure contemplates that many users can use one Computer 1202, or that one user can use multiple computers 1202.

Described implementations of the subject matter can include one or more features, alone or in combination.

For example, in a first implementation, a computer-implemented method, comprising: receiving registration information from a server for authenticating and registering the server; registering the server if the registration information is authenticated; saving the registration information; receiving a request from the server for generating a 2D code, wherein the request includes information to be encoded to the 2D code; digitally signing the information to be encoded to the 2D code by generating a digital signature using asymmetrical encryption; and sending the digitally signed information to the server to be encoded to the 2D code.

The foregoing and other described implementations can each, optionally, include one or more of the following features:

A first feature, combinable with any of the following features, decrypting the 2D code after the 2D code is scanned by a user computing device; and saving a record that the 2D code is scanned, wherein the record includes the server that encodes the 2D code.

A second feature, combinable with any of the previous or following features, wherein the 2D code is scanned by using an application or software authorized by a server that generates the digital signature.

A third feature, combinable with any of the previous or following features, further comprising determining if the server is registered before digitally sign the information to be encoded to the 2D code.

A fourth feature, combinable with any of the previous or following features, wherein the digital signature is generated using a private key based on the asymmetrical encryption.

A fifth feature, combinable with any of the previous or following features, wherein the private key used to generate the digital signature is unique to the information to be encoded to the 2D code.

A sixth feature, combinable with any of the previous or following features, wherein the asymmetrical encryption is performed by using a Rivest-Shamir-Adleman (RSA) algorithm.

In a second implementation, a non-transitory, computer-readable medium storing one or more instructions executable by a computer system to perform operations comprising: receiving registration information from a server for authenticating and registering the server; registering the server if the registration information is authenticated; saving the registration information; receiving a request from the server for generating a 2D code, wherein the request includes information to be encoded to the 2D code; digitally signing the information to be encoded to the 2D code by generating a digital signature using asymmetrical encryption; and sending the digitally signed information to the server to be encoded to the 2D code.

The foregoing and other described implementations can each, optionally, include one or more of the following features:

A first feature, combinable with any of the following features, decrypting the 2D code after the 2D code is scanned by a user computing device; and saving a record that the 2D code is scanned, wherein the record includes the server that encodes the 2D code A second feature, combinable with any of the previous or following features, wherein the 2D code is scanned by using an application or software authorized by a server that generates the digital signature A third feature, combinable with any of the previous or following features, further comprising determining if the server is registered before digitally sign the information to be encoded to the 2D code.

A fourth feature, combinable with any of the previous or following features, wherein the digital signature is generated using a private key based on the asymmetrical encryption.

A fifth feature, combinable with any of the previous or following features, wherein the private key used to generate the digital signature is unique to the information to be encoded to the 2D code.

A sixth feature, combinable with any of the previous or following features, wherein the asymmetrical encryption is performed by using an RSA algorithm.

In a third implementation, A computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving registration information from a server for authenticating and registering the server; registering the server if the registration information is authenticated; saving the registration information; receiving a request from the server for generating a 2D code, wherein the request includes information to be encoded to the 2D code; digitally signing the information to be encoded to the 2D code by generating a digital signature using asymmetrical encryption; and sending the digitally signed information to the server to be encoded to the 2D code.

The foregoing and other described implementations can each, optionally, include one or more of the following features:

A first feature, combinable with any of the following features, decrypting the 2D code after the 2D code is scanned by a user computing device; and saving a record that the 2D code is scanned, wherein the record includes the server that encodes the 2D code A second feature, combinable with any of the previous or following features, wherein the 2D code is scanned by using an application or software authorized by a server that generates the digital signature A third feature, combinable with any of the previous or following features, further comprising determining if the server is registered before digitally sign the information to be encoded to the 2D code.

A fourth feature, combinable with any of the previous or following features, wherein the digital signature is generated using a private key based on the asymmetrical encryption.

A fifth feature, combinable with any of the previous or following features, wherein the private key used to generate the digital signature is unique to the information to be encoded to the 2D code.

A sixth feature, combinable with any of the previous or following features, wherein the asymmetrical encryption is performed by using an RSA algorithm.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a first server, registration information from a second server for authenticating and registering the second server;
   registering, by the first server, the second server if the registration information is authenticated;
   saving, by the first server, the registration information;
   receiving, by the first server, a request from the second server for generating a two-dimensional (2D) code, wherein the request includes information to be encoded to the 2D code;

in response to receiving, by the first server, the request from the second server for generating the 2D code:
   determining, by the first server, that the second server has registered at the first server;
   digitally signing, by the first server, the information to be encoded to the 2D code by generating a digital signature using asymmetrical encryption; and
   sending, by the first server, the digitally signed information to the second server to be encoded to the 2D code by the second server;
decrypting the 2D code after the 2D code is scanned by a user computing device; and
saving a record that the 2D code is scanned, wherein the record includes identity information of the second server that encodes the 2D code.

2. The computer-implemented method of claim 1, wherein the 2D code is scanned by using an application or software authorized by a server that generates the digital signature.

3. The computer-implemented method of claim 1, further comprising determining if the second server is registered before digitally sign the information to be encoded to the 2D code.

4. The computer-implemented method of claim 1, wherein the digital signature is generated using a private key based on the asymmetrical encryption.

5. The computer-implemented method of claim 4, wherein different private keys are used to generate different digital signatures based on different information to be encoded to the 2D code.

6. The computer-implemented method of claim 4, wherein the asymmetrical encryption is performed by using a Rivest-Shamir-Adleman (RSA) algorithm.

7. A non-transitory, computer-readable medium storing one or more instructions executable by a computer system to perform operations comprising:
   receiving, by a first server, registration information from a second server for authenticating and registering the second server;
   registering, by the first server, the second server if the registration information is authenticated;
   saving, by the first server, the registration information;
   receiving, by the first server, a request from the second server for generating a two-dimensional (2D) code, wherein the request includes information to be encoded to the 2D code;
   in response to receiving, by the first server, the request from the second server for generating the 2D code:
      determining, by the first server, that the second server has registered at the first server;
      digitally signing, by the first server, the information to be encoded to the 2D code by generating a digital signature using asymmetrical encryption; and
      sending, by the first server, the digitally signed information to the second server to be encoded to the 2D code by the second server;
   decrypting the 2D code after the 2D code is scanned by a user computing device; and
   saving a record that the 2D code is scanned, wherein the record includes identity information of the second server that encodes the 2D code.

8. The non-transitory, computer-readable medium of claim 7, wherein the 2D code is scanned by using an application or software authorized by a server that generates the digital signature.

9. The non-transitory, computer-readable medium of claim 7, further comprising determining if the second server is registered before digitally sign the information to be encoded to the 2D code.

10. The non-transitory, computer-readable medium of claim 7, wherein the digital signature is generated using a private key based on the asymmetrical encryption.

11. The non-transitory, computer-readable medium of claim 10, wherein different private keys are used to generate different digital signatures based on different information to be encoded to the 2D code.

12. The non-transitory, computer-readable medium of claim 10, wherein the asymmetrical encryption is performed by using a Rivest-Shamir-Adleman (RSA) algorithm.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   receiving, by a first server, registration information from a second server for authenticating and registering the second server;
   registering, by the first server, the second server if the registration information is authenticated;
   saving, by the first server, the registration information;
   receiving, by the first server, a request from the second server for generating a two-dimensional (2D) code, wherein the request includes information to be encoded to the 2D code;
   in response to receiving, by the first server, the request from the second server for generating the 2D code:
      determining, by the first server, that the second server has registered at the first server;
      digitally signing, by the first server, the information to be encoded to the 2D code by generating a digital signature using asymmetrical encryption; and
      sending, by the first server, the digitally signed information to the second server to be encoded to the 2D code by the second server;
   decrypting the 2D code after the 2D code is scanned by a user computing device; and
   saving a record that the 2D code is scanned, wherein the record includes identity information of the second server that encodes the 2D code.

14. The computer-implemented system of claim 13, wherein the 2D code is scanned by using an application or software authorized by a server that generates the digital signature.

15. The computer-implemented system of claim 13, further comprising determining if the second server is registered before digitally sign the information to be encoded to the 2D code.

16. The computer-implemented system of claim 13, wherein the digital signature is generated using a private key based on the asymmetrical encryption.

17. The computer-implemented system of claim 16, wherein different private private keys are used to generate different digital signatures based on different information to be encoded to the 2D code.

* * * * *